United States Patent [19]

Kreuger et al.

[11] Patent Number: 4,870,226

[45] Date of Patent: Sep. 26, 1989

[54] MULTI-CONDUCTOR HIGH VOLTAGE CABLE, IN PARTICULAR THREE-CONDUCTOR CABLE

[75] Inventors: Frederik H. Kreuger, Delft; Antonius M. F. J. Van De Laar, Wagenberg, both of Netherlands

[73] Assignee: N.K.F.KABEL B.V., Delft, Netherlands

[21] Appl. No.: 172,024

[22] Filed: Mar. 22, 1988

[30] Foreign Application Priority Data

Mar. 23, 1987 [NL] Netherlands ................. 8700680

[51] Int. Cl.⁴ ............................................ H01B 7/18
[52] U.S. Cl. ........................... 174/102 R; 174/23 R; 174/106 R; 174/107; 174/113 R
[58] Field of Search ............. 174/102 R, 107, 113 R, 174/23 R, 106 R

[56] References Cited

U.S. PATENT DOCUMENTS

| | | | |
|---|---|---|---|
| 2,408,416 | 10/1946 | Edgar et al. | 174/102 R |
| 3,413,408 | 11/1968 | Robinson | 174/113 R |
| 3,509,269 | 4/1970 | Elliott | 174/107 |
| 3,742,363 | 6/1973 | Carle | 174/102 R |
| 3,790,694 | 2/1974 | Portinari | 174/23 R |
| 4,658,089 | 4/1987 | Guzy et al. | 174/113 R |
| 4,665,281 | 5/1987 | Kamis | 174/102 R |
| 4,703,132 | 10/1987 | Marciano-Agostindli et al. | 174/23 R X |

FOREIGN PATENT DOCUMENTS

| | | |
|---|---|---|
| 1665589 | 9/1970 | Fed. Rep. of Germany . |
| 2007163 | 9/1971 | Fed. Rep. of Germany . |
| 3330957 | 3/1985 | Fed. Rep. of Germany .... 174/23 R |
| 2188260 | 1/1974 | France . |
| 2384336 | 10/1978 | France . |
| 688185 | 2/1953 | United Kingdom ............ 174/113 R |
| 1089376 | 9/1964 | United Kingdom . |

Primary Examiner—Morris H. Nimmo
Attorney, Agent, or Firm—Webb, Burden, Ziesenheim & Webb

[57] ABSTRACT

Multi-conductor high voltage cable, in particular a three-conductor cable, each conductor having an extruded polyolefin conductor insulation, said cable further comprising an extruded polyolefin belt insulation surrounding all insulated conductors and an electrically conducting sheath, surrounding the belt insulation. According to the present invention the conductor insulation of each conductor is surrounded by at least one tape or layer of material comprising cells or cavities and/or at least one tape or layer of material comprising cells or cavities is applied between the belt insulation and all insulated conductors. Preferably said tape or layer is formed by swelling tape.

12 Claims, 2 Drawing Sheets

MULTI-CONDUCTOR HIGH VOLTAGE CABLE, IN PARTICULAR THREE-CONDUCTOR CABLE

The present invention relates to a multi-conductor high voltage cable, in particular a three-conductor cable, each conductor having an extruded polyolefin conductor insulation, further comprising an extruded polyolefin belt insulation surrounding all insulated conductors and an electrically conducting sheath, surrounding the belt insulation.

With such high voltage cables it must be ensured that no cavities or fissures are present in the insulation or between electrically conducting surfaces and the adjacent insulation, in particular at locations with string field concentrations. If there are cavities in the insulation, the electric field at that location may cause the acceleration of electrons which ionize the gas, which eventually can produce sparking resulting in damage to the insulation, which greatly reduces the service life of the insulation.

The insulation used for the core(s) in a high-voltage cable is generally oil-impregnated paper layers which are wound around the individual cores and around the stranded cores. When the armour of a cable is damaged, moisture may penetrate into the cable. This moisture tends to move along the length of the cable. However, oil-impregnated paper provides adequate lengthwise watertightness.

In more modern cables instead of paper, extruded homogeneous layers of, for example, thermoplastic material are used such as in particular ethylene propylene rubber (EPR), high density annd low pressure polyethylene, cross-linked polyethylene and polypropylene. During production, each core is covered with a core insulation which can also consist of an extruded plastic. In a multi-conductor cable, a conducting shield is located around each individual core insulation, according to the "Hoechstaedter" principle. The whole unit is generally surrounded by a bedding and an armour sheath of steel bands or steel wires or lead. A further protective watertight outer sheath is applied around this.

However, these cables with plastic insulation have considerably reduced lengthwise tightness to water or moisture, because the different layers of insulation material do not always fit closely to each other, and there is no oil to fill up fissures present here.

For that reason, these cable have hitherto been surrounded outside the electrically conducting armour sheath, or between this shield and an electrically conducting screen below it, by a swelling tap applied helically or in some other way, and made of, for example, a non-woven polypropylene in which the inter fibre spaces are filled with a powder such as cellulose powder which swells when in contact with water. This means that, when damage occurs and water penetrates, the swelling tape will swell, causing the cable parts to be pressed more firmly against each other and closing up lengthwise cavities and fissures underneath the swollen swelling tape. In the event of damage, the type of swelling tape can give lengthwise watertightness which is such that the water can penetrate along only about 1 m of cable within 24 hours. This gives sufficient time for repair, and only a short length of the cable on either side of the damage need be replaced.

In the swelling tape various other materials which swell when they absorb water may be used instead of cellulose powder for instance methyl cellulose powder.

It will be clear that there are cavities and cells in this swelling tape and that the filling of the granules of swelling powder cannot be considered to be homogeneous, while the fibre structure of the swelling tape will not be homogeneous either, as is expected of the conductor insulation in an electric field to prevent the above-mentioned ionizing discharges adversely affecting the insulation. The condition that cavities or fissures must not occur within the electric field cannot therefore be met in practice with a swelling tape, which is why it has been used hitherto only in those areas where no electric field occurs. It was assumes that if it was fitted in the cable, where strong electric fields are present, the insulation of the cable would be greatly harmed as a result of the discharges in the swelling tape.

It has, however, now surprisingly been found that the opposite is the case, in other words, if the swelling tape is also fitted in areas with string electric fields, the service lift of the cable is actually considerably extended, or for a normal service lift it is possible to work with much stronger fields.

It has emerged from further investigations that it is not the swelling tape as such which gives the surprising results. It is already sufficient if, according to the invention, there is at least one tape or layer of material comprising cells or cavities between the electric conductor and the electrically conducting sheath. The cells or cavities must be of such dimensions that any electrons in these cavities or cells under the influence of the electric field cannot move such a free distance or develop such speed that electron collisions lead to ionization of the gases and other harmful consequences.

The beneficial effect according to the invention can therefore be achieved with the above-mentioned tape or layer, but it can be provided in many different embodiments. The layer can consist, for example, of porous material which is permeable to liquid and gas, such as a fibrous material, thus for example the swelling tape without the swelling powder. Suitable materials are therefore in generally non-woven materials, but also woven materials which can, for example, be wound in band form. The effect is, however, also achieved with a layer of raw swelling powder. Cavities and cells producing the favourable, unexpected effect are found between the granules here too. A layer of foamed plastic with closed or open cells can also be used. The material of the layer itself is not important. Of course, this material must not be electrically conducting. Several of the above-mentioned layers or tape can also be placed on top of or above one another in a sandwich form. The layer is preferably deformable and/or elastic.

From the point of view of cable manufacture, there are a number of factors which make the use of the usual swelling tape preferred. The latter in fact produces not only the advantageous effect according to the present invention, but also provides good watertightness and moisture-proofing along the length of the cable. The manufacture and fitting of a swelling tape constitute no problem, because such a tape is already generally used.

In the case of a multicore cable, the layer according to the invention will preferably be provided around the insulation layer of each individual conductor. If the layer is provided around the conductor insulation, the usual conducting layer, as with Hoechstaedter, can be left out, resulting in the belt insulation cable according to the invention, which will be described in greater detail below. The layer can, of course, also be fitted below the common belt insulation surrounding all insulated cores.

Tests have shown that, entirely contrary to expectations, when such a layer or swelling tape is fitted in an area with strong electric fields, the puncture strength and the service life of the cable are improved or extended considerably.

This is an all the more surprising result because, in experiments with the said layers in the usual manner in strong electric fields without fixed intermediate layer, for example between two high voltage bulbs, this effect was not found.

British Patent No. 1,089,376 discloses a three conductor electrical cable having a space filler of hemp or foamed plastic between the stranded insulated conductor and a surrounding metal shield. However, this cable is not suitable for high voltages above e.g. 1000 Volt.

The invention will now be explained in greater detail with reference to the figures showing cross sections of cables in which the measures according to the invention are applied.

FIG. 1 shows the use of a tape or a layer according to the present invention to increase the break down value in a three-conductor cable.

Figure 1:
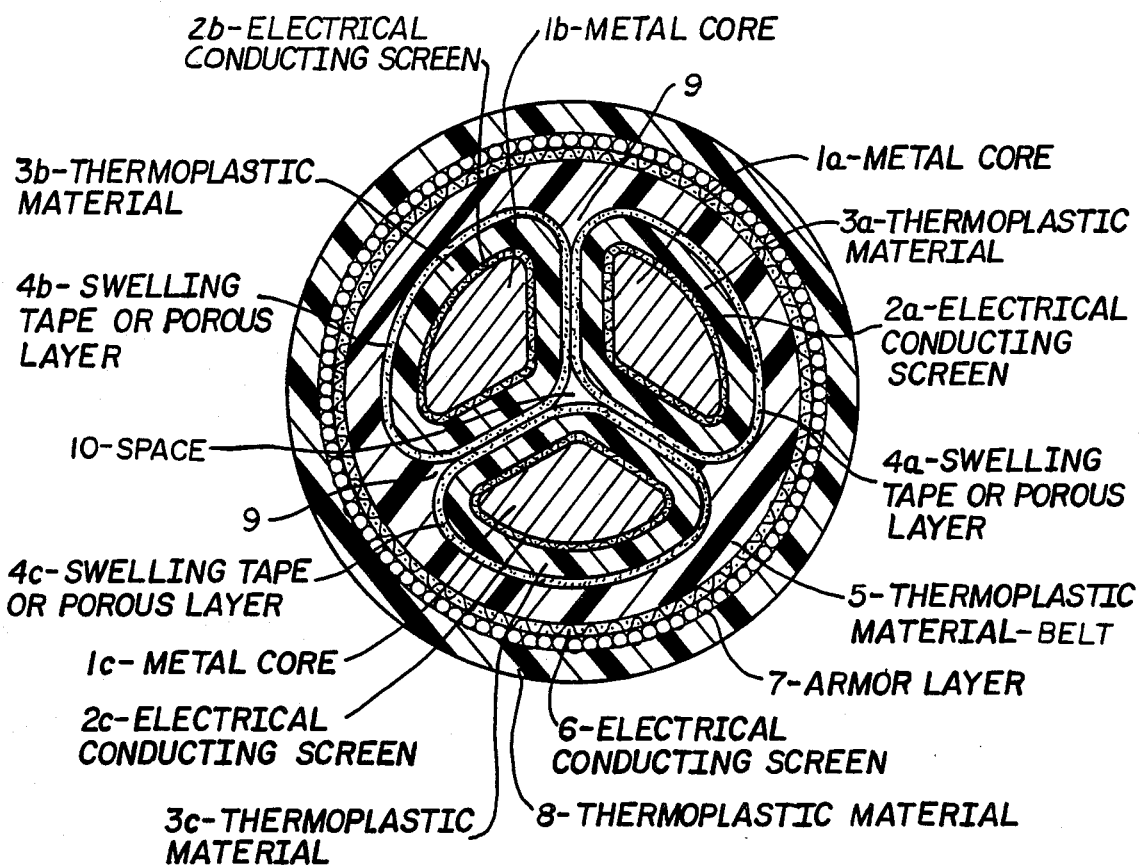
FIGS. 1, 2 and 3 show cross sections of a three-conductor three-phase cables according to the present invention.

The cross-section of FIG. 1 shows three cores $1a$, $1b$ and $1c$. Each core will preferably consist of a solid core, but can also be composed of a large number of individual stranded wires. An electrically conducting screen $2a$, $2b$, $2c$ may first be placed around each core or conductor, said screen consisting of an electrically conducting, possibly extruded material. One or more layers of homogeneous thermoplastic such as an extruded polyolefin material, indicated by reference numbers $3a$, $3b$ and $3c$, is then placed as conductor insulation on each core thus covered.

According to the present invention, each thus insulated core now has provided around it, on the outside surface of said insulation layers $3a$, $3b$ and $3c$, a swelling tape or another porous layer $4a$, $4b$, $4c$, which can be of the type described in greater detail above. This tape may be wound helically or folded lengthwise around each individual insulated core. Several tapes may also overlap each other fully or partially. The conducting shields, such as with Hoechstaedter, can be dispensed with here.

A belt insulation layer 5 of plastic material such as an extruded polyolefin is disposed round the three stranded cores $1a$, $1b$ and $1c$ thus wrapped with swelling tape, preferably in such a way that the spaces at 9 are also filled up during the extrusion of th belt sheath 5. This layer 5 then bears the armour 7, if necessary with insertion of an electrically conducting screen 6 under this armour. The armour 7 may consist of steel bands or steel wires or of a lead sheath. A watertight protective layer 8 of the usual type is, finally, placed on this armour layer 7.

As stated above, the swelling tapes round the individual insulated cores produce much greater break down strength. This swelling tape is located here in areas where very high field intensities can occur, thus between the individual cores and between the cores and the electrically conducting sheath. Nevertheless, normally expected adverse effects such as ionization and disruptive discharge do not occur in this tape. The whole unit has greater break down strength and a much longer service life than cables without such layers or tapes.

Figure 2:
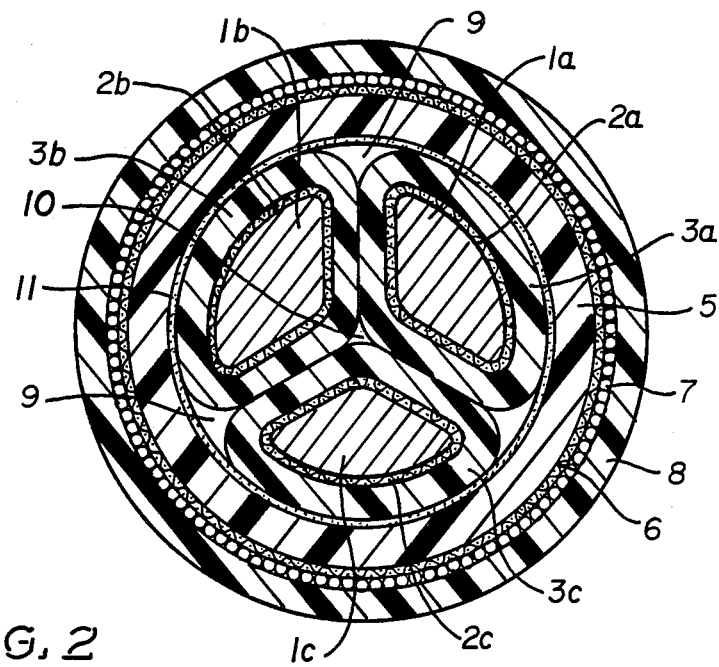

Such a swelling tape or other layer according to the present invention can also be applied below the common belt insulation layer 5 around the stranded insulated conductors $1a$, $1b$ and $1c$. This is shown in FIG. 2, reference number 11. The space 10 between the three cores may also be filled with porous material or another suitable substance, or preferably with swelling tape in order to produce the effect of the present invention. This also applies to any spaces at 9. The said spaces 10 and at 9 may also be filled up with the swelling tape $4a$, $b$ and $c$ through deformation of said swelling band.

Figure 3:
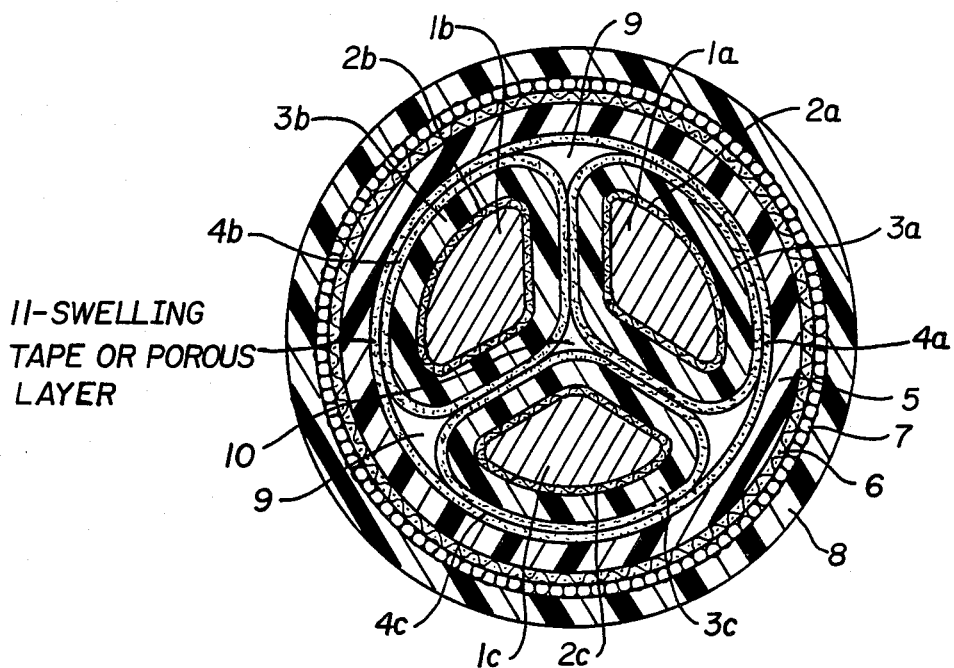

This effect and other advantages of the present invention will be obtained in particular with the high voltage cable shown in FIG. 3. Here each insulated conductor $1a,b,c$ with insulation $3a,b,c$ is surrounded by a tape or layer $4a,b,c$ of the present invention, and such tape or layer 11 is applied moreover between the belt insulation 5 and the three stranded insulated conductors.

As pointed out above, another tape or layer of, for example, porous material can be used instead of the swelling tape. The layer can also consist of elastic synthetic material sprayed on or extruded during manufacture having cavities or cells which may or may not be connected together. Layers of non-woven material, such as felt or non-impregnated paper are also very suitable. The thickness of the layer is not very critical. In the case of swelling tape function known hitherto according to the state of the art, where the tape was provided outside the electric field. In general, the thickness of the tape or layer according to the present invention can be limited to a minimum, but preferably is such that the porous layer or swelling tape can fill up cavities or fissures between adjoining parts of the cable and such that a great compactness is achieved. The layer according to the present invention thus prevents adverse effects of the strong electric fields through and the total cable cross-section.

Three cross-section of cables and the measures according to the invention are explained in detail above with reference to the examples of embodiments given in FIGS. 2 and 3. However, it is obvious that the invention is not limited to these specific applications and embodiments of cables. The invention can, for example, also be used for more than three cores, in which case a swelling tape or another layer working in the same way is disposed round all or only a part of insulated cores. The important factor is that the said layer lies in an area with strong electric fields where adverse effects could occur.

If the layers 4 and 11 consist of a swelling tape of the usual type, it fulfils two functions, viz. giving lengthwise watertightness and moisture-proofing through swelling up of the swelling powder when water penetrates, but principally, according to the present invention, considerably increasing the break down strength of the cable as a result of the gas-filled cavities or cells present in this swelling tape.

We claim:

1. Multi-conductor high voltage cable, in particular a three-conductor cable, each conductor having an extruded polyolefin conductor insulation, further comprising an extruded polyolefin belt insulation surrounding all insulated conductors and an electrically conducting sheath, surrounding the belt insulation, wherein the conductor insulation of each conductor is surrounded by at least one tape or layer of material comprising cells or cavities.

2. Multi-conductor high voltage cable, in particular a three-conductor cable, each conductor having an extruded polyolefin conductor insulation, further comprising an extruded polyolefin belt insulation surrounding all insulated conductors and an electrically conducting sheath, surrounding the belt insulation, and including a layer of metallic armor surrounding said electrically conducting sheath, and wherein at least one tape or layer of material comprising cells or cavities, is applied between the belt insulation and all insulated conductors.

3. Multi-conductor high voltage cable, in particular a three-conductor cable, each conductor having an extruded polyolefin conductor insulation, further comprising an extruded polyolefin belt insulation surrounding all insulated conductors and an electrically conducting sheath surrounding the belt insulation, wherein the conductor insulation of each conductor is surrounded by at least one tape or layer of material comprising cells or cavities and further including at least one tape or layer of material comprising cells or cavities applied between the belt insulation and all insulated conductors.

4. Multi-conductor cable as claimed in one of claims 1 or 2, characterized in that the at least one tape or layer consists of one or more non-woven fibre films.

5. Multi-conductor cable as claimed in one of claims 1 or 2, characterized in that the at least one tape or layer consists of woven material.

6. Multi-conductor cable as claimed in one of claims 1 or 2, characterized in that the at least one tape or layer consists of foam plastic or foam rubber having closed or open cells.

7. Multi-conductor cable as claimed in one of claims 1 or 2, characterized in that the at least one tape or layer consists of powder.

8. Multi-conductor cable as claimed in one of claims 1 or 2, characterized in that the at least one tape or layer is composed of a multi-layer composite comprising a plurality of layers.

9. Multi-conductor cable as claimed in one of claims 1 or 2, characterized in that the at least one tape or layer is formed from swelling tape.

10. Multi-conductor cable as claimed in claims 1 or 2, characterized in that the at least one tape or layer is of such thickness that upon twisting the insulated conductors and applying the belt insulation all cavities and slits between adjoining parts are filled.

11. Multi-conductor cable as claimed in claims 1 or 2, characterized in that the at least one tape or layer consists of a swelling tape and formed of a fibre film of polypropylene impregnated with cellulose powder.

12. Multi-conductor cable as claimed in claims 1 or 2, the polyolefin conductor insulation and/or belt insulation consists of ethylene propylene rubber (EPR); high density or low density polyethylene; cross-linked polyethylene or polypropylene.

* * * * *

UNITED STATES PATENT AND TRADEMARK OFFICE
CERTIFICATE OF CORRECTION

PATENT NO. : 4,870,226

DATED : September 26, 1989

INVENTOR(S) : Frederik H. Kreuger and Antonius M. F. J. Van De Laar

It is certified that error appears in the above-identified patent and that said Letters Patent is hereby corrected as shown below:

Under References Cited U.S. Patent Documents
    "4,703,132 10/1987 Marciano-Agostindli et al. ... 174/23 R X"
should read
    --4,703,132 10/1987 Marciano-Agostinelli et al. ... 174/23 R X--.

Column 1 Line 16 "string" should read --strong--.

Column 1 Line 34 "pressure" should read --density--.

Column 1 Line 54 "tap" should read --tape--.

Column 1 Line 63 "the" (second occurrence) should read --this--.

Column 2 Line 15 "assumes" should read --assumed--.

Column 2 Line 21 "string" should read --strong--.

Column 2 Line 22 "lift" should read --life--.

Column 2 Line 23 "lift" should read --life--.

Column 1 Line 34, "annd" should read --and--.

UNITED STATES PATENT AND TRADEMARK OFFICE
CERTIFICATE OF CORRECTION

PATENT NO. : 4,870,226

DATED : September 26, 1989

INVENTOR(S) : Frederik H. Kreuger and Antonius M. F. J. Van De Laar

It is certified that error appears in the above-identified patent and that said Letters Patent is hereby corrected as shown below:

Column 3 Line 8 "cable" should read --cables--.

Column 3 Line 37 after "thermoplastic" insert --material--.

Column 3 Line 38 after "polyolefin" delete --material--.

Column 3 Line 55 "th" should read --the--.

Column 4 Line 31 after "tape" insert --, the thickness can be the same as the usual thickness for the swelling tape--.

Column 4 Line 42 "cross-section" should read --cross-sections--.

Claim 12 Line 27 Column 6 after "2," insert --characterized in that--.

Signed and Sealed this

Ninth Day of October, 1990

Attest:

HARRY F. MANBECK, JR.

Attesting Officer

Commissioner of Patents and Trademarks